United States Patent [19]
Tamura

[11] Patent Number: 6,094,253
[45] Date of Patent: Jul. 25, 2000

[54] MICROFILM SEARCH DEVICE

[75] Inventor: Hiroshi Tamura, Kanagawa, Japan

[73] Assignee: Fuji Photo Film Co., Ltd., Kanagawa, Japan

[21] Appl. No.: 09/187,487

[22] Filed: Nov. 6, 1998

[30] Foreign Application Priority Data

Nov. 6, 1997 [JP] Japan ..................................... 9-319189

[51] Int. Cl.⁷ ........................... G03B 27/52; G03B 23/02; G03B 23/12
[52] U.S. Cl. ................................. 355/40; 355/41; 353/25; 353/26 A
[58] Field of Search ................................. 355/27, 40, 41; 353/25 A, 25, 26 A, 26 R, 27 A, 27 R, 107, 108; 358/403, 405, 451, 453; 250/559.01–559.04, 560

[56] References Cited

U.S. PATENT DOCUMENTS

| | | | |
|---|---|---|---|
| 4,453,823 | 6/1984 | Sugita et al. | 355/50 |
| 4,611,907 | 9/1986 | Inatsuki | 355/41 |
| 5,354,994 | 10/1994 | Hicks | 250/561 |
| 5,416,605 | 5/1995 | Hideshima et al. | 358/451 |
| 5,570,206 | 10/1996 | Yoshinaga | 358/497 |
| 5,590,941 | 1/1997 | Hideshima | 353/26 A |
| 5,758,939 | 6/1998 | Ochiai et al. | 353/25 |

*Primary Examiner*—Safet Metjahic
*Assistant Examiner*—Hung Henry Nguyen
*Attorney, Agent, or Firm*—Sughrue, Mion, Zinn, Macpeak & Seas, PLLC

[57] ABSTRACT

There is disclosed a microfilm search device for detecting the presence of frames from a density change in the running direction of a microfilm, in which even if a frame contains therein a portion having substantially the same density as that of an interspace between frames, the portion is prevented from being incorrectly determined as between-frames, and frames are correctly detected to prevent a search error. The device is provided with an encoder for outputting a sampling signal for each predetermined feeding amount of the microfilm; plural density sensors for detecting a film density in different positions along a width direction within a frame travel width to output density signals; a binarizing section for binarizing the density signals into binarized signals having a logic ZERO or ONE in synchronization with the sampling signal; a determination section for detecting the presence of frames using a logical product or a logical sum of the plural binarized signals to output a determination signal; and a searching section for searching for a desired frame based on the determination signal.

4 Claims, 7 Drawing Sheets

MICROFILM SEARCH DEVICE

BACKGROUND OF THE INVENTION

1. Field of the Invention

The present invention relates to a microfilm search method and device which searches a desired frame by determining the presence of frames from a density change in the microfilm running direction.

2. Description of the Related Art

In a known microfilm search method, document or image marks (blips) are photographed or recorded beside the frames on microfilm and used as reference marks. The blips of microfilm during running are read and counted, and the blip count is used to identify frame addresses when a specific frame is sought. On the other hand, there is proposed a search method in which, instead of using the blips, the presence of frames is directly detected, and a desired frame is searched for from a sequence of detected frames.

In a case where the frames are detected as aforementioned, if the frame contains therein a portion having substantially the same density as that of an interspace of the frames (between the frames), this portion is incorrectly determined as between-frames. For example, when the microfilm is a negative film, a background portion in the frame on which an image or original document is photographed becomes black (non-transparent), while a peripheral portion surrounding the frame is white (transparent). When black characters or figures are depicted on a white background of the original, the character or graphic region becomes transparent (null) in the frame. Accordingly, if the presence of frames is determined from a density change on the microfilm, the transparent (null) portion other than a between-frame is incorrectly determined as between-frames. This causes an error in counting the number of frames, and therefore, correct frame search cannot be performed.

SUMMARY OF THE INVENTION

The present invention has been accomplished under the circumstances above, and an object thereof is to provide a microfilm search device in which even if a frame has therein a portion having substantially the same density as that of an interspace between frames, the portion is prevented from being incorrectly determined as between-frames, and frames are correctly detected to prevent a search error.

The object of the present invention is attained by the provision of a microfilm search device for searching a desired frame from a microfilm by detecting the presence of frames from a density change in the running direction of the microfilm, comprising:

an encoder for outputting a sampling signal for each predetermined feeding amount of the microfilm;

plural density sensors for detecting the film density in different positions along a width direction within a frame travel width to output density signals;

a binarizing section for binarizing the density signals into binarized signals, each of which has logic ZERO or logic ONE, in synchronization with said sampling signal;

a determination section for detecting the presence of frames using a logical product or a logical sum (i.e., only one of the logical product and logical sum) of the plural binarized signals to output a determination signal indicative of the presence of the frame; and a searching section for searching for the desired frame based on said determination signal.

When the binarizing section outputs the binarized signal which indicates logic ZERO in response to a portion corresponding to the background of an original recorded in the frame of the microfilm, and indicates logic ONE in response to an interspace of frames, it is determined that there are frames in a portion where the logical product of the plural binarized signals becomes logic ZERO, and it is determined that there is no frame in a portion where the logical product becomes logic ONE. Alternatively, the logical sum of the plural binarized signals is obtained to determine that there is no frame where a distance for which the logical sum continuously becomes logic ONE is equal to or longer than a predetermined value.

Additionally, when the binarized signal outputted by the binarizing section is reversed, that is, when the logic ONE is outputted for the portion corresponding to the background of the original while the logic ZERO is outputted for the portion between the frames, it is determined that there is a frame in the portion where the logical sum of the plural binarized signals becomes logic ONE. On the other hand, it is determined that there is no frame where the distance for which the logical product continuously becomes logic ZERO is equal to or longer than the predetermined value.

BRIEF DESCRIPTION OF THE DRAWINGS

FIG. 6A shows an arrangement of frames and photosensors for detecting film density on a microfilm;

FIG. 6B shows binarized signals obtained from outputs of the photosensors; and

FIG. 6C shows changes of a logical sum and a logical product of all binarized signals.

DETAILED DESCRIPTION OF THE PREFERRED EMBODIMENT

Principle of the Invention

Figure 6A:
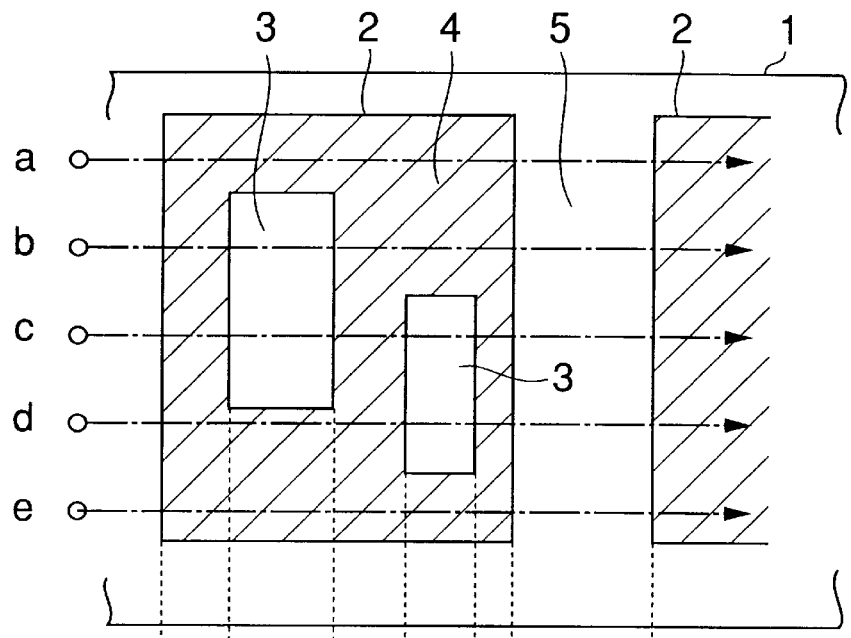
FIGS. 6A to 6C are diagrams explaining the principle of the present invention.
Figure 6B:
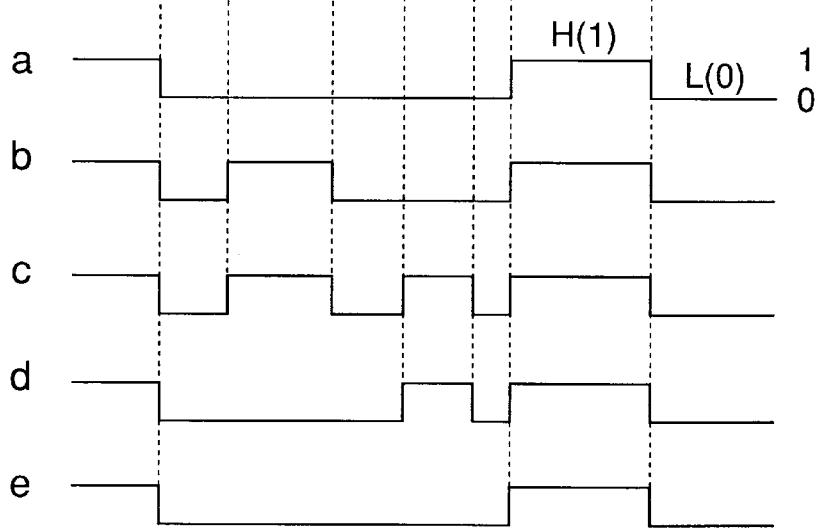
Figure 6C:
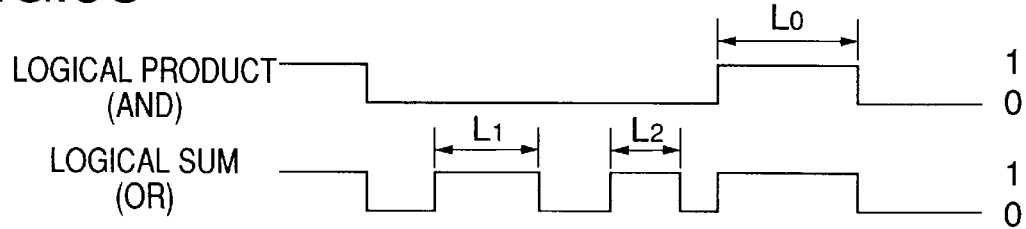
Figure 7A:
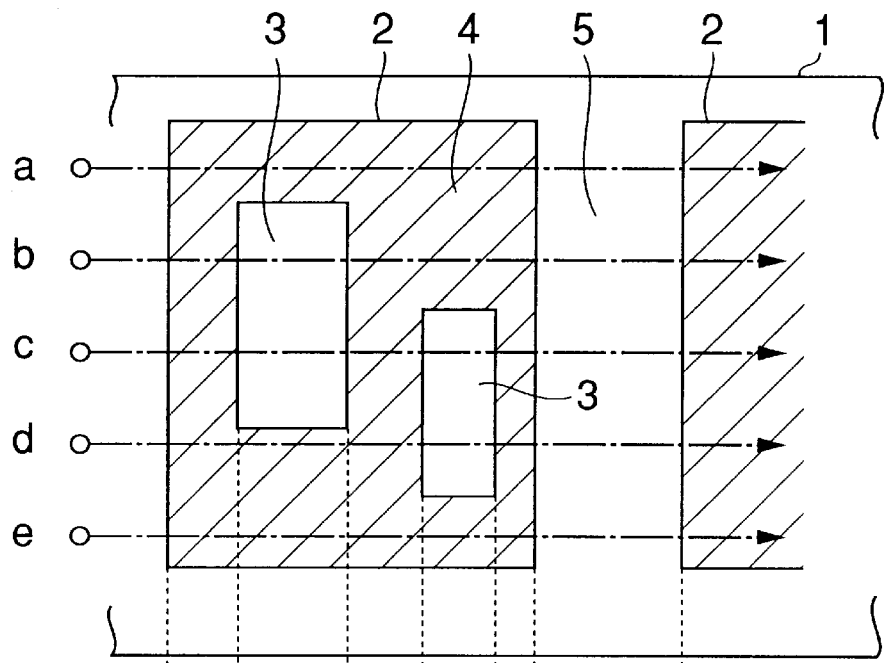
FIGS. 7A to 7C are diagrams similarly explaining the principle of the present invention, in which the logic of the binarized signal shown in FIG. 6 is reversed.

FIGS. 6 and 7 are diagrams explaining the principle of the present invention. FIG. 6 shows a case where the background portion of the original is set to logic ZERO 0; level L) while the outside of the frame or the character (image) portion of the original is set to logic ONE (1; level H). In FIG. 6A, a reference numeral 1 denotes a microfilm, and an original is photographed in a negative system in which white and black are reversed. Accordingly, in a photographed frame 2, the white background of the original is recorded as black, while characters or graphic images on the original are recorded as white (transparent).

There are supposedly transparent null areas 3, 3 in the frame 2. The null area corresponds to a portion filled with black in the original (blackened portion). Five photosensors (a) to (e) for detecting the density of the film 1 are arranged at equal intervals along the width direction of the film 1. Accordingly, when the film 1 runs toward the left relative to the photosensors (a) to (e) on the figure, the photosensors (a) to (e) relatively scan the film 1 toward the right on the figure.

FIG. 6B shows binarized signals which are obtained by binarizing outputs from the photosensors (a) to (e) with a predetermined threshold value, and time or scanning position on the film 1 is shown toward the right in the figure. Each of the density signals outputted by the photosensors (a) to (e) has high intensity (level H) of the light passing through an outside (transparent null area) 5 of the frame 2, and low intensity (level L) of the light passing through an original background portion 4 recorded as black in the frame 2. The density signal having multi-level intensity is binarized into two definite levels H and L by the predetermined threshold value. The level H is outputted as the binarized signal which has the logic ONE (1) and the level L is outputted as the binarized signal representing the logic ZERO (0). Therefore, if there is a null area 3 in the frame on the scanning loci of the photosensors (a) to (e), the logic ONE (level H) is obtained in the null area 3.

A logical product AND and a logical sum OR of all binarized signals (a) to (e) are obtained as shown in FIG. 6C. The logical product AND turns to logic ZERO (level L) in the region of the frame 2, and to logic ONE (level H) in the interspace (between-frames) 5 of the frames 2. By counting how many times the logical product AND changes from ONE to ZERO, the number of frames in the microfilm can be counted, so that the desired frame can be sought.

When the logical sum OR is obtained instead of the logical product AND, a portion corresponding to the null area 3 in the frame 2 turns to logic ONE (level H). Supposing that length $L_1$, $L_2$ of the null area 3 is shorter than a distance $L_0$ between frames, if a distance in which the logic ONE continues is longer than a predetermined value L ($L_1$, $L_2$<L<$L_0$), this portion is determined as between-frames. If the distance is shorter than the value, L, this portion is determined as the null area, but not as between-frames. For example, the predetermined value L is set to 0.5 mm.

Figure 7B:
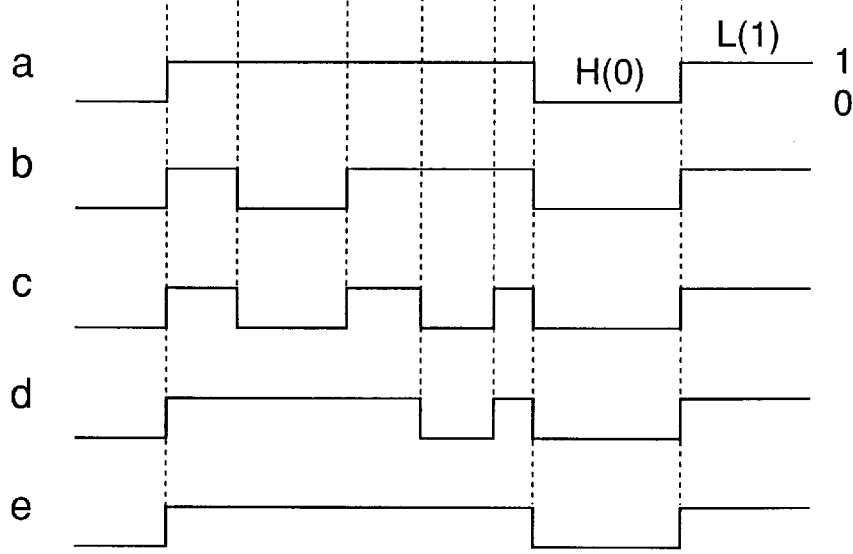
Figure 7C:
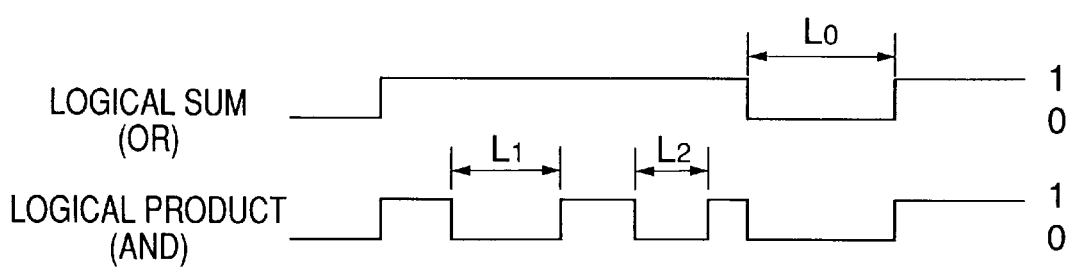

As seen in FIG. 7, the logic of the binarized signal may be reversed. Specifically, as shown in FIG. 7B, the logic is ZERO in the outside 5 of the frame 2 in which the density signal indicates level H. On the other hand, the logic is ONE in the original background portion 4 in the frame 2 where the density signal indicates level L. In this case, as shown in FIG. 7C, a range in which the logical sum-OR of the binarized signals (a) to (e) turns to logic ZERO represents between-frame, and a range in which the logical sum OR turns to logic ONE represents in-frame. Moreover, the logical product AND of the binarized signals (a) to (e) turns to logic ZERO in the between-frame 5 and in the null area 3 in the frame. Therefore, if the distance $L_1$, $L_2$, $L_0$ for which the logic ZERO continues is longer than the predetermined value L, such portion is determined as between-frames, i.e., the interspace of the adjacent frames. On the other hand, if the distance is shorter than the value L, such portion can be determined as in-frame.

Embodiment

A preferred embodiment will be described in more details hereinafter with reference to FIGS. 1 to 5.

Figure 1:
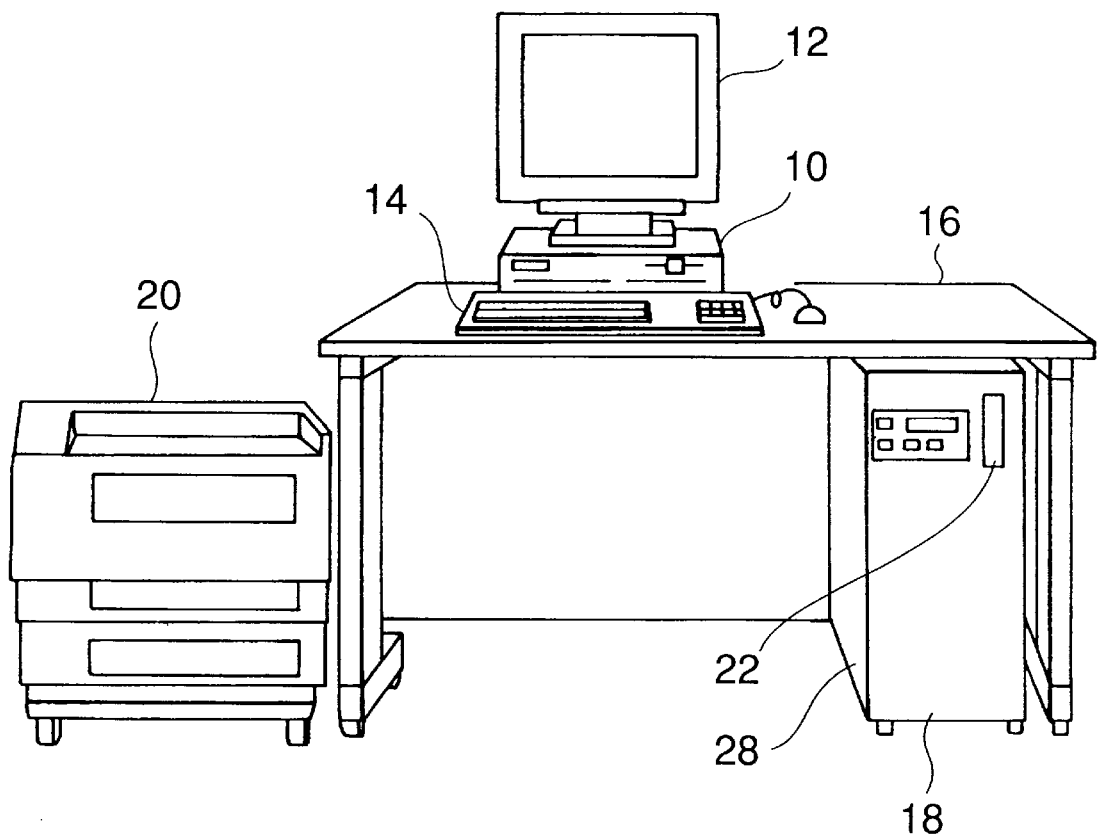
FIG. 1 is a diagram showing an image reading and processing apparatus which incorporates a microfilm search device of an embodiment according to the present invention.

In FIG. 1, a reference numeral 10 denotes a computer body containing a CPU or other processing means. Display means 12 such as a CRT or a liquid crystal panel, and a keyboard 14 are placed on a desk 16. A scanner 18 is stored under the desk 16 and incorporates therein a microfilm search device according to the present invention. Numeral 20 denotes a printer placed beside the desk 16.

The scanner 18 has a cartridge insertion port 22 formed in the upper portion of its front panel. The scanner 18 reads, at a low resolution, an image on a roll of microfilm 26 with a width of 16 mm held in a cartridge 24 (refer to FIGS. 2 and 3) which is loaded through the insertion port 22. The CPU in the computer body 10 performs a predetermined image processing of the read image, and the resultant image is displayed on the display means 12.

The reading or scanning operation of the image is carried out while the roll film 26 moves without moving a line sensor 96, which will be described hereinafter in details. During the operation, the CRT display device 12 sequentially changes and displays the read image synchronously with the travel of the film 26. Therefore, the displayed image moved in the display surface of the CRT 12 is in synchronization with the travel of the film 26, so that the displayed image may be substantially the same as that which is projected on a screen.

For a manual search, an operator monitors the image on the display means 12 and instructs a print output of a required image on the display means 12. In response to this output instruction, the scanner 18 sets a corresponding frame in the correct position, and reads the entire image on the frame at a high resolution. The high density image is printed by the printer 20, and either stored in an optical magnetic disk, a hard disk, or the like, or transferred to an external storage device.

For an automatic search, the address of a desired frame is input through the keyboard 14. In the automatic search, as aforementioned, the frames on the microfilm 26 are detected, and the number of the frames is counted to search for a desired frame. The frame search is performed by the searching section 114 using the determination results of the determination section 112 indicating the presence of frames.

The structure of the scanner 18 will now be described. The scanner 18 has a vertically longitudinal casing 28, in which there are arranged a feed reel driving unit 30 in the upper portion of the front side and a take-up reel driving unit 32 at the lower portion of the front side. When the cartridge 24 is inserted into the cartridge insertion port 22, the cartridge 24 is moved automatically so that a reel 24A held in the cartridge 24 engages with a rotating shaft of the feed reel driving unit 30. And then, the feed reel driving unit 30 pulls out the leader portion of the roll film 26 from the cartridge 24 and feeds it downward to guide it to a take-up reel 32A in the take-up reel driving unit 32.

Figure 2:
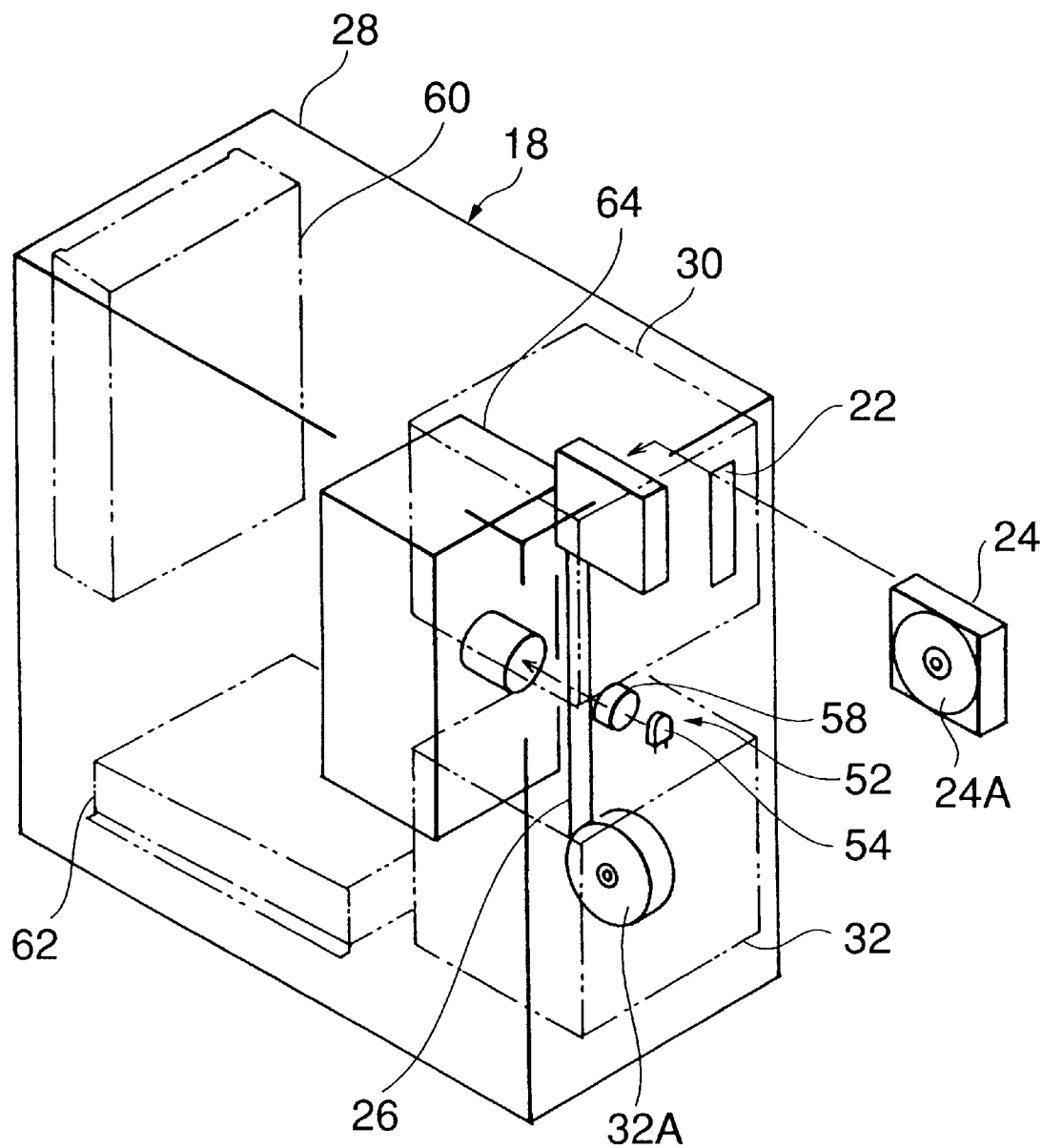
FIG. 2 is a perspective view illustrating the interior of a scanner for use in the embodiment of FIG. 1.
Figure 3:
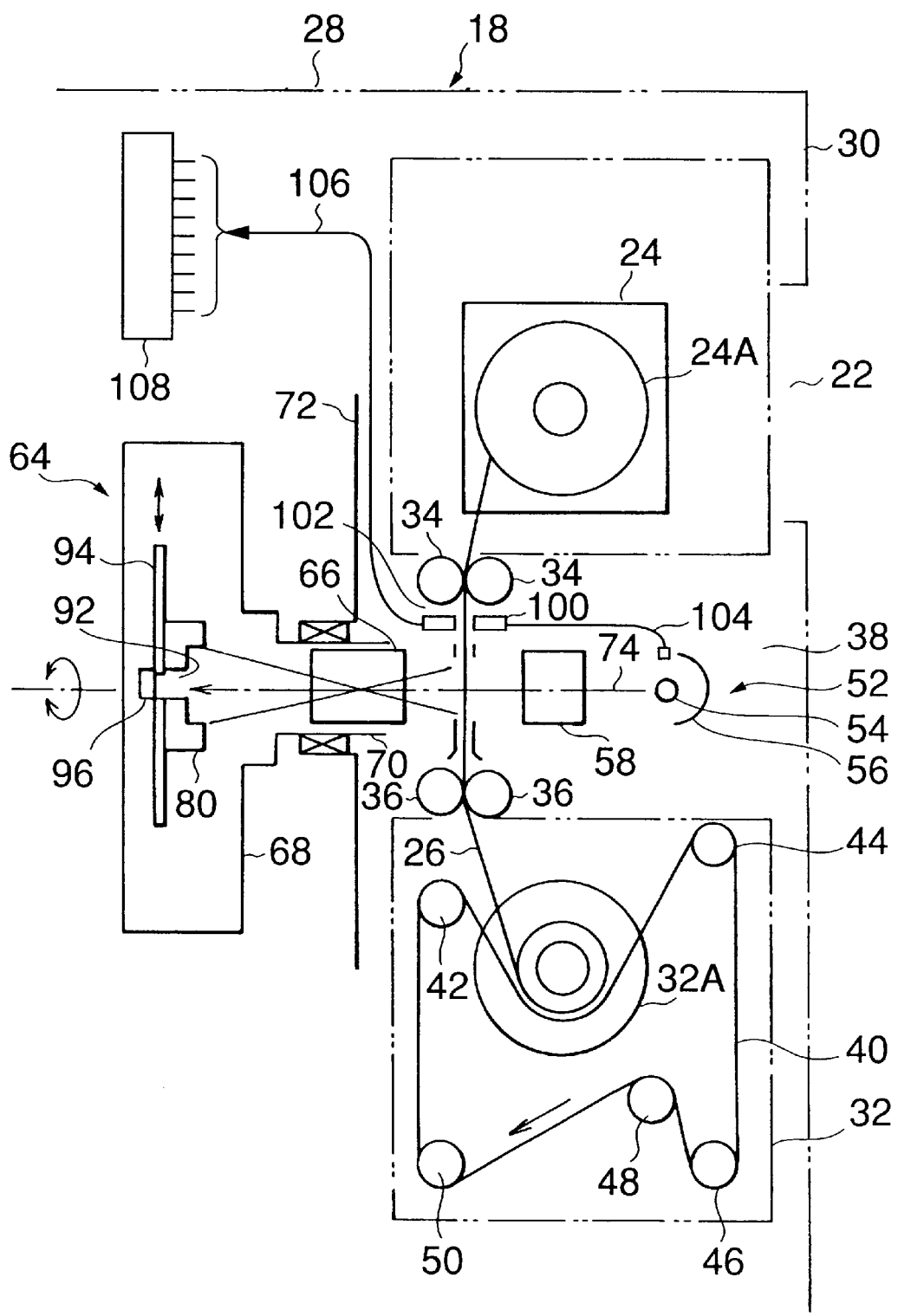
FIG. 3 is a side view illustrating an arrangement of main parts of scanner shown in FIGS. 1 and 2.

When viewing the scanner 18 in FIGS. 2 and 3, the film 26 passes through the rear side of the open space between the reel driving units 30, 32, that is, the film 26 passes through at the inner back side viewed from the front of the casing 28. Referring to FIG. 3, there are shown guide rollers 34, 34, 36 and 36 for guiding the film 26. Accordingly, a space 38 is defined by the open area between the reel driving unit 30, 32 and a front panel 28A of the casing 28, and a light source 52, which will be described later, is housed in this space 38.

The take-up reel driving unit 32 has a drive belt 40 which travels while contacting the reel 32A as shown in FIG. 3. The drive belt 40 is wound on guide rollers 42 and 44, a drive roller 46, an encoder 48 and a tension roller 50, and it is driven by the drive roller 46 in a film take-up direction (indicated by an arrow in FIG. 3). The encoder 48 outputs a sampling signal every time a constant feeding amount of the film 26 (e.g., 0.1 mm) is reached. The sampling signal functions as a clock signal for determining a timing for binarizing the density signal.

The light source 52 is housed in the space 38 between the above-described reel driving units 30 and 32, and includes a lamp 54, a reflection mirror 56, a condenser lens 58, and an appropriate filter. In FIG. 2, a power supply circuit 60 and a power control circuit 62 for controlling an actuator such as a motor are illustrated.

Figure 4:
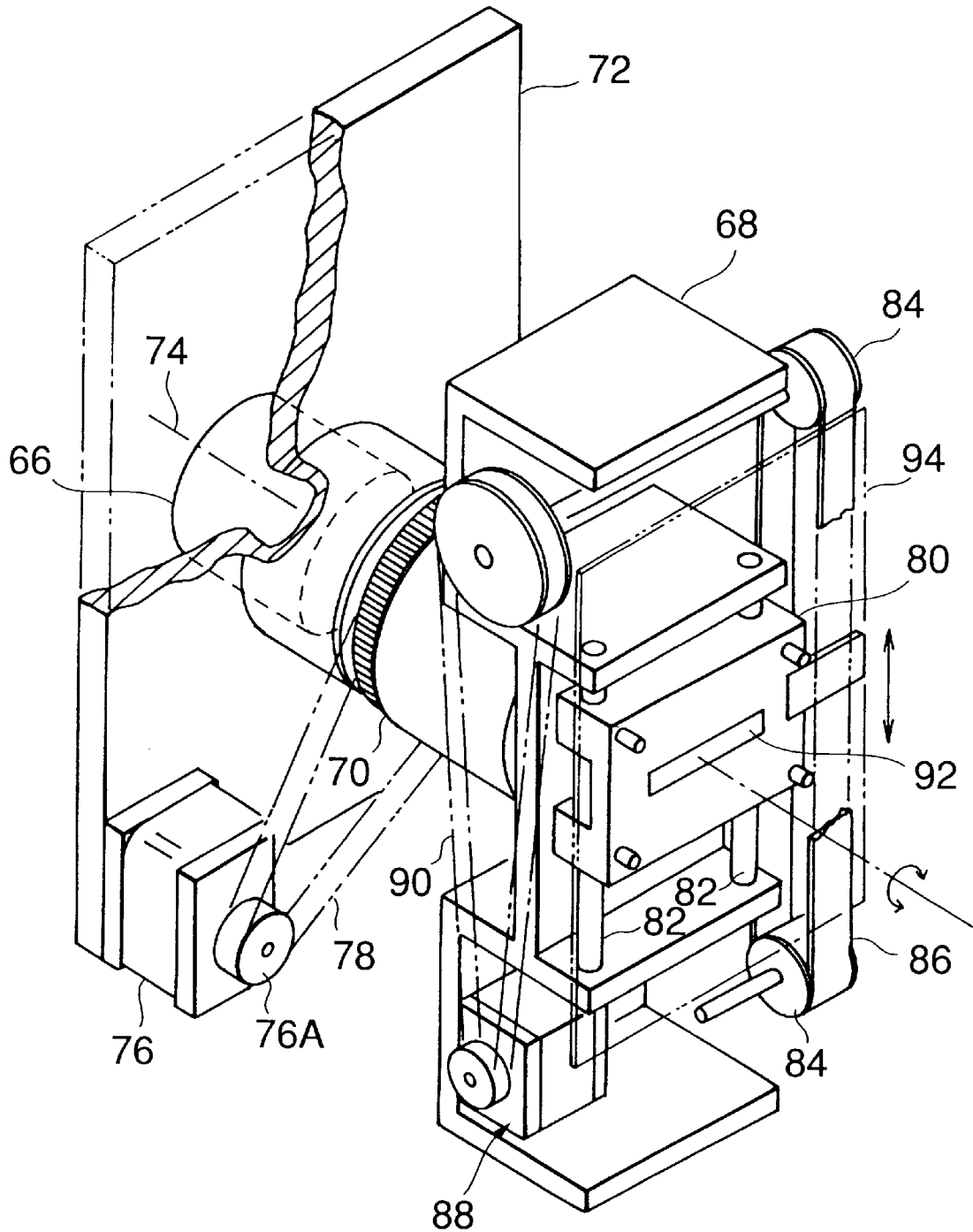
FIG. 4 is a perspective view illustrating a line sensor unit in the scanner of FIG. 3.

A line sensor unit 64 will now be described. The line sensor unit 64 is integrated with a projection lens 66. More specifically, as shown in FIGS. 3 and 4, a cylindrical portion 70 for holding the projection lens 66 is integrally formed with a frame (rotatable frame) 68 of the line sensor unit 64. The projection lens 66 mounted in the cylindrical portion 70 is a fixed focus lens with a magnifying power of approximately two. The cylindrical portion 70 is rotatably supported by a frame (fixed frame) 72, which is secured to the casing 28, so that the inclination of an image to be read can be corrected. The cylindrical portion 70 rotates about a light axis 74 perpendicular to the surface of the film 26.

A belt 78 is wound around the cylindrical portion 70 of the rotary frame 68 and a pulley 76A of a servo motor 76 mounted on the fixed frame 72. As the servo motor 76 rotates, the rotary frame 68 rotates around the light axis 74.

On the rotary frame 68, a movable plate 80 is provided on the side opposite to the cylindrical portion 70 as shown in FIG. 4. The movable plate 80 is slidably mounted on a pair of guide rods 82, 82 to permit the movable plate 80 to reciprocate in the vicinity of an opening of the cylindrical portion 70 in a direction perpendicular to the light axis 74.

In the rotary frame 68, a belt 86 wound on pulleys 84, 84 extends in a direction parallel to the up-and-down moving direction of the movable plate 80, and one side of the movable plate 80 is fixed to the belt 86. The rotation of a servo motor 88 is transmitted via a belt 90 to one of the pulleys 84. With this structure, when the servo motor 88 rotates forward and in reverse, the movable plate 80 reciprocates across a plane perpendicular to the light axis 74.

On the movable plate 80, an elongated window (narrow slit) 92 is formed in a direction perpendicular-to the guide rods 82, 82, i.e., in a direction perpendicular to the up-and-down moving direction of the movable plate 80. The window 92 has a longitudinal center that corresponds with the light axis 74. A printed circuit board 94 is fixed to the rear face of the movable plate 80, i.e., the face opposite to that facing the cylindrical portion 70, so as to be perpendicular to the light axis 74.

A longitudinal CCD arrayed line sensor 96 is fixed to the board 94 to face the window 92 (FIG. 3). In addition, a preamplifier for amplifying the output of the line sensor 96 is mounted on the board 94. The positioning of the light reception face of the CCD line sensor 96 must correspond to a plane on which an image projected from the projection lens 66 is focused.

Figure 5:
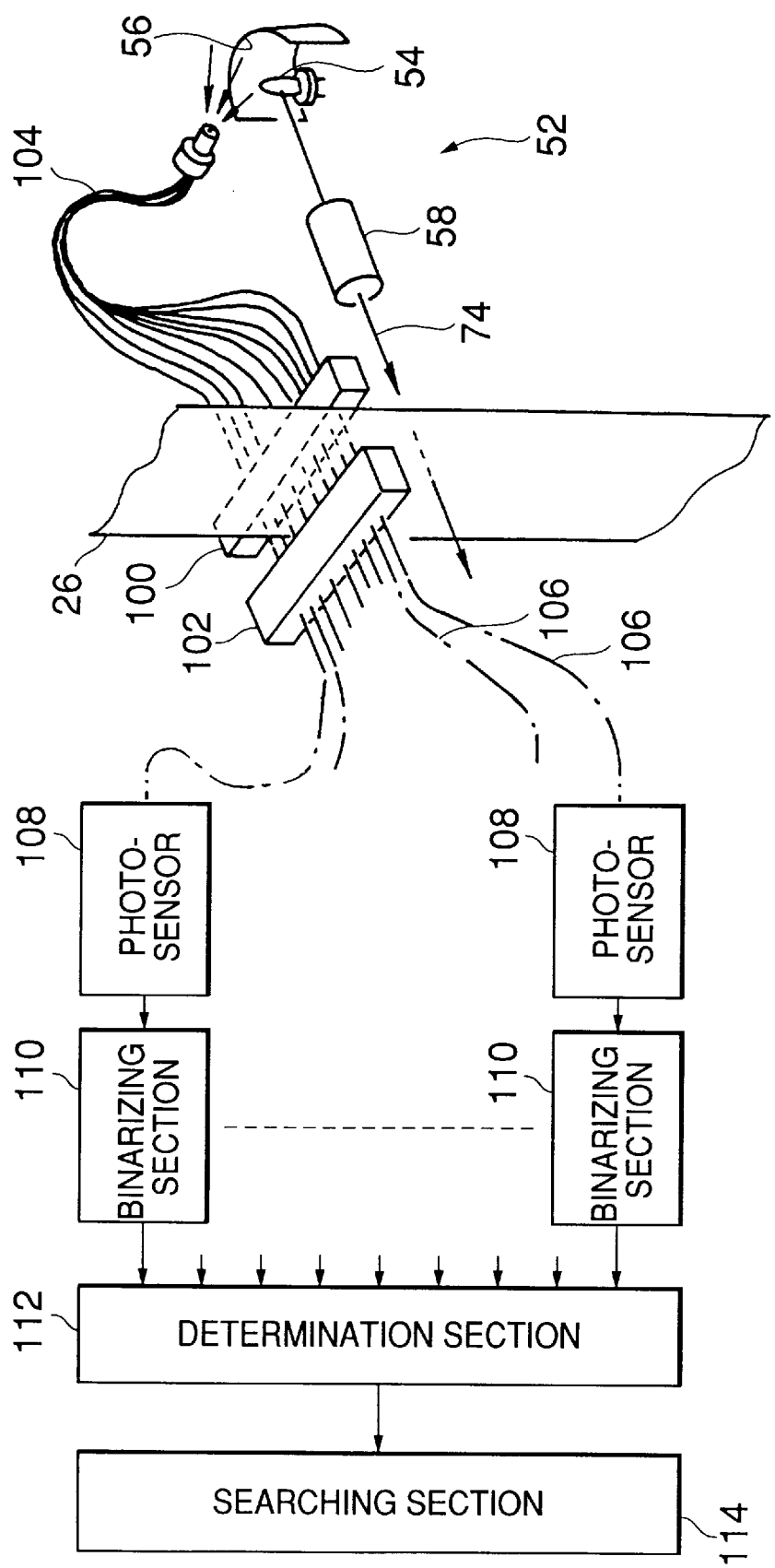
FIG. 5 is a diagram showing an arrangement of main parts of the microfilm search device of the embodiment and explaining an flow of operation according to the present invention.

A frame detecting device will next be described with reference to FIG. 5. In a position in front of the position where an image on the microfilm 26 is read, i.e., on the upstream side of the light axis 74 (the side of the feed reel 24A), a pair of optical fiber holding blocks 100 and 102 are provided in such a manner that they extend across the film 26 along the width direction and they are opposed to both faces of the film 26 with slight gaps. optical fibers 104 and 106, nine each being arranged in the film width direction, are inserted through the blocks 100 and 102, respectively.

The optical fibers 104, 106 are held in the blocks 100, 102, so that the optical axes of the fibers 104, 106 are perpendicular to the film 26, and end faces of the fibers 104, 106 are opposed to each other with the film 26 placed therebetween. Specifically, the end faces of nine optical fibers 104 are opposed to the end faces of nine optical fibers 106, respectively. As a result, there are nine sets of the opposed end faces with the film 26 placed therebetween.

Nine optical fibers 104 held in the block 100 are bunched and guided toward the vicinity of the lamp 54 of the light source 52. Light beams are radiated from the lamp 54 to the nine optical fibers 104, and guided to one surface (surface on the side of the block 100) of the film 26.

The light beams emitted from the nine optical fibers 104 pass through the film 26 and enter the opposed optical fibers 106 held in the block 102. The nine optical fibers 106 are guided from the block 102 to the nine photosensors 108, respectively. Density signals outputted from the nine photosensors 108 are separately transmitted to binarizing sections 110, sampled in synchronization with a sampling signal outputted from the encoder 48, and binarized with a predetermined threshold value. The threshold value is set in accordance with a difference in density between a frame and an outer periphery of the frame.

Nine binarized signals are transmitted to determination sections 112, respectively, in which determination results indicative of the presence of frames are obtained based on the output of each photosensor 108. Specifically, the determination sections 112 obtain the logical product or the logical sum of the nine binarized signals as aforementioned to discriminate in-frame and between-frames based on the product or the sum.

As photographing systems for recording images on the microfilm, there are Simplex, Duplex, Duo, and other photographing systems. To detect and isolate one frame, the number and arrangement of the photosensors may be varied in accordance with the systems. Preferably, the nine photosensors 108 are positioned along the film width. direction in such a manner that plural photosensors 108 constantly run on and within one frame even if the photographing system differs. That is, the photosensors used for detection of the frame are selected based on the photographing system. By using outputs of plural photosensors which scan the running width of one frame, the presence of frames is determined. In the determination section 112, the presence of frames is determined from the determination results obtained by selected photosensors. Thus, the change of the photographing system such as Simplex, Duplex and Duo can be dealt with at ease. The end faces of nine optical fibers 104, 106 are positioned on a straight line perpendicular to the running direction of the film 26 as shown in FIG. 5.

In the embodiment described above, since light is guided to each optical fiber 104 using the light source 52 for image projection, a light-source structure can advantageously be simplified. In the present invention, however, another light source may be used. Alternatively, light may be guided to each optical fiber 104 using a plurality of light sources.

In the embodiment, since the optical fibers 104 and 106 are used as aforementioned, the film density can be detected at plural positions arranged adjacent to one another in the width direction of the narrow film 26. However, in the present invention, density sensors sufficiently small to be arranged adjacent to one another can be used. For example, a photo transistor array or a photo diode array in which photo transistors or photo diodes are arranged on the straight line across the film can be used. Moreover, a CCD line sensor may be used.

Furthermore, in the present invention, since the density sensors (photosensors) are arranged on the straight line perpendicular to the film running direction, the presence of frames can be detected at the same time. Therefore, a deviation in output timing of each density sensor (photosensor) does not need to be corrected like in a case where a plurality of arranged density sensors (photosensors) are deviated from the film running direction. A circuit structure is thus simplified.

As aforementioned, according to the present invention, the film densities are detected in plural different positions along the width direction within the frame travel width, the density signals obtained at the plural positions are respectively binarized in synchronization with the sampling signal, and the logical product AND or the logical sum OR of the binarized signals corresponding the plural positions is used to detect the presence of frames (i.e., only of the logical product and logical sum). Therefore, even if the frame contains therein a portion having substantially the same density as that of the outside of the frame, the portion is prevented from being incorrectly determined as out-frame (between-frames). Therefore, frame detection accuracy is improved, and frame detection error can be prevented.

In a case where setting is performed in such a manner that the binarized signal turns to logic ZERO in a portion corresponding to an original background in the frame and turns to logic ONE outside the frame (i.e., between-frames), it can be determined that there are frames in a portion where the logical product AND of plural binarized signals becomes ONE. On the other hand, it can be determined that there is no frame in a portion where the logical product becomes ZERO. When the logical sum OR is used instead of the logical product, it can be determined that there is no frame, if a distance for which the logical sum is continuously logic ONE is equal to or longer than a predetermined value L.

What is claimed is:

1. A microfilm search device for searching a desired frame from a microfilm by detecting the presence of frames from a density change in the running direction of the microfilm, comprising:

an encoder for outputting a sampling signal for a predetermined feeding amount of the microfilm;

plural density sensors for detecting the film density in different positions along a width direction within a frame travel width to output density signals;

a binarizing section for binarizing the density signals into binarized signals, each of which has logic ZERO or logic ONE, in synchronization with said sampling signal;

a determination section for detecting the presence of frames using only one of a logical product and a logical sum of the plural binarized signals to output a determination signal indicative of the presence of the frame; and a searching section for searching for the desired frame based on said determination signal, wherein said binarizing section outputs the binarized signals, one of which indicates logic ZERO for a portion corresponding to the background of an original in the frame, and another of which indicates logic ONE for a portion between frames; and wherein said determination section determines that there are frames in a portion where the logical product of the plural binarized signals becomes logic ZERO, and determines that there is no frame in a portion where the logical product becomes logic ONE.

2. A microfilm search device for searching a desired frame from a microfilm by detecting the presence of frames from a density change in the running direction of the microfilm, comprising:

an encoder for outputting a sampling signal for a predetermined feeding amount of the microfilm;

plural density sensors for detecting the film density in different positions along a width direction within a frame travel width to output density signals;

a binarizing section for binarizing the density signals into binarized signals, each of which has logic ZERO or logic ONE, in synchronization with said sampling signal;

a determination section for detecting the presence of frames using only one of a logical product and a logical sum of the plural binarized signals to output a determination signal indicative of the presence of the frame; and a searching section for searching for the desired frame based on said determination signal, wherein said binarizing section outputs the binarized signal, one of which indicates logic ZERO for a portion corresponding to the background of an original in the frame, and another of which indicates logic ONE for a portion between frames; and wherein said determination section determines that there is no frame in a portion where a distance for which the logical sum of the plural binarized signals is continuously logic ONE is equal to or longer than a predetermined value.

3. A microfilm search device for searching a desired frame from a microfilm by detecting the presence of frames from a density change in the running direction of the microfilm, comprising:

an encoder for outputting a sampling signal for a predetermined feeding amount of the microfilm;

plural density sensors for detecting the film density in different positions along a width direction within a frame travel width to output density signals;

a binarizing section for binarizing the density signals into binarized signals, each of which has logic ZERO or logic ONE, in synchronization with said sampling signal;

a determination section for detecting the presence of frames using only one of a logical product and a logical sum of the plural binarized signals to output a determination signal indicative of the presence of the frame; and a searching section for searching for the desired frame based on said determination signal, wherein said binarizing section outputs the binarized signal, one of which indicates logic ONE for a portion corresponding to the background of an original in the frame, and another of which indicates logic ZERO for a portion between frames; and wherein said determination section determines that there are frames in a portion where the logical sum of the plural binarized signals becomes logic ONE, and determines there is no frame in a portion where the logical sum becomes logic ZERO.

4. A microfilm search device for searching a desired frame from a microfilm by detecting the presence of frames from a density change in the running direction of the microfilm, comprising:

an encoder for outputting a sampling signal for a predetermined feeding amount of the microfilm;

plural density sensors for detecting the film density in different positions along a width direction within a frame travel width to output density signals;

a binarizing section for binarizing the density signals into binarized signals, each of which has logic ZERO or logic ONE, in synchronization with said sampling signal;

a determination section for detecting the presence of frames using only one of a logical product and a logical sum of the plural binarized signals to output a determination signal indicative of the presence of the frame; and a searching section for searching for the desired frame based on said determination signal, wherein said binarizing section outputs the binarized signal, one of which indicates logic ONE for a portion corresponding to the background of an original in a frame, and another of which indicates logic ZERO for a portion between frames; and wherein said determination section determines that there is no frame in a portion where a distance for which the logical product of the plural binarized signals is continuously logic ZERO is equal to or longer than a predetermined value.

* * * * *